United States Patent [19]
Richley

[11] Patent Number: 5,898,872
[45] Date of Patent: Apr. 27, 1999

[54] SOFTWARE RECONFIGURATION ENGINE

[75] Inventor: Thomas E. Richley, San Diego, Calif.

[73] Assignee: Tominy, Inc., Cincinnati, Ohio

[21] Appl. No.: 08/933,660

[22] Filed: Sep. 19, 1997

[51] Int. Cl.[6] ........................................................ G06F 9/44
[52] U.S. Cl. ............................................. 395/703; 395/653
[58] Field of Search ..................................... 395/651, 652, 395/653, 701, 702, 703

[56] References Cited

U.S. PATENT DOCUMENTS

| 5,423,023 | 6/1995 | Batch et al. | 395/500 |
| 5,581,764 | 12/1996 | Fitzgerald et al. | 395/703 |
| 5,765,142 | 6/1998 | Allred et al. | 705/26 |

Primary Examiner—Kevin A. Kriess
Attorney, Agent, or Firm—Harness, Dickey & Pierce, P.L.C.

[57] ABSTRACT

Single users or workgroups interact with the reconfiguration engine through the software reconfiguration workbench. The target source code is reconfigured through a collection of semi-automated and fully automated processes in a step-by-step iterative technique. The system maintains a repository of data corresponding to the software entities being reconfigured. Several modules within the reconfiguration engine access this repository allowing the modules to perform a rigorous reconfiguration through a series of iterative refinements. The target source code is analyzed based on a user-configurable lexicon of keywords and also based on attribute tables maintained in the repository. Software entities undergoing change are tagged using a tagging system that denotes the type of change operation to be performed and the degree of certainty that the tag has been properly assigned. Impact analysis across the entire software system detects entities subject to change by monitoring data flow between software systems. Impact analysis thus identifies software entities that might otherwise have been overlooked. Source code changes are applied using code master templates selected based on the tags. New programs can also be generated using code master templates selected based on the tags which can be used to convert the data files in the system to correspond to the changed application code.

15 Claims, 16 Drawing Sheets

Figure 10

Tominy Workbench - [Project Analysis]

File  Organizer  COMP2000  Repository  Tools  Window  Help

| DBMS Criteria | Date Criteria | Custom Criteria | Analysis |

Choose analysis options:
- ☐ Analyze Schemas
- ☐ Analyze Programs
- ☐ Analyze Copybooks
- ☐ Analyze Maps

| Seq# | Date Keyword | Length | Tag | Actn | Window |
|---|---|---|---|---|---|
| 60 | -CEN | 4 | cy | - | |
| 51 | DATE | 5 | jul | + | |
| 50 | DATE | 6 | mdy | ? | |
| 52 | DATE | 8 | m/d/y | ? | |
| 12 | DAY | 5 | jul | + | |
| 2 | DDMMYR | 6 | dmy | + | |
| 1 | DDMMYY | 6 | dmy | + | |
| 22 | DMY | 5 | jul | + | |
| 40 | DT | 6 | ymd | ? | |
| 34 | DT | 8 | m/d/y | + | |
| 41 | DT | 5 | jul | + | |
| 11 | JUL | 5 | jul | + | |
| 10 | JULIAN | 6 | mdy | + | |
| 20 | MDY | 6 | mdy | + | |
| 4 | DDMMYR | | | | |

Choose search criteria:
- ☐ Ignore Cobol Comments

Specify filename to save:
`c:\tominy\work\datesave.tx`

Update Date verbs and target objects ...

Figure 13

Tominy Workbench - [Attributes]

File  Organizer  COMP2000  Repository  Tools  Window  Help

System Name: sys

| System | Object Name | Type | Attribute | Tag |
|---|---|---|---|---|
| sys | SBAINPRT | W | WS-DATE-YMD | +ymd |
| sys | SBAINPRT | W | WS-DAYNUM | +jul |
| sys | SBAINPRT | W | WS-JULIAN | # |
| sys | SBAINPRT | W | WS-OP-CUST-DRIL-DAYS | # |
| sys | SBAINPRT | W | WS-OP-CUST-INVP-YR | +yy |
| sys | SBAINPRT | W | WS-OP-CUST-LATE-DAYS | # |
| sys | SBAINPRT | W | WS-PI-L20-DSC1D-DAYS | # |
| sys | SBAINPRT | W | WS-PI-L3-DSC1C-DAYS | -yy |
| sys | SBAINPRT | W | WS-PI-L7-FROM-YR | -yy |
| sys | SBAINPRT | W | WS-PI-L7-FROM-YR-AN | -yy |
| sys | SBAINPRT | W | WS-PI-L7-TO-YR | -yy |
| sys | SBAINPRT | W | WS-PI-L7-TO-YR-AN | -yy |
| sys | SBAINPRT | W | WS-PI-L8-INV-YR | -yy |
| sys | SBAINPRT | W | WS-YY | +yy |

Order by sys_name, object_name, attr_name

SOFTWARE RECONFIGURATION ENGINE

BACKGROUND AND SUMMARY OF THE INVENTION

The present invention relates generally to computer system software development and maintenance. More particularly, the invention relates to a reconfiguration system for applying source code and data format modifications to a computer software system in an organized and automated fashion. The reconfiguration system has many uses in developing and maintaining complex software systems. It will be described herein with respect to the "Year 2000" problem.

The Year 2000 problem is a widespread problem that will affect most major computer systems throughout the world. Simply stated, the problem results from the inherent ambiguity of using two digits as an abbreviation for a four-digit year. Numerous solutions have been proposed to address the problem. In some applications a "windowed" approach has been proposed, in which a two-digit year above a certain number is treated as a year in the twenty-first century, and a two-digit year below that number is treated as a year in the twentieth century. Clearly, the windowed approach will not work in all applications. Thus in some systems the best solution is to expand the two-digit year into a four-digit year. Expanding the year is not a simple conversion process because any such change in the computer code or data may have avalanche-like effects upon other parts of the code or data.

The Year 2000 problem exemplifies the more fundamental problem of updating source code or file layouts in complex software systems. Calls by reference techniques, use of pointers and the linking of tables in relational databases can make it very difficult to effect software modifications. To illustrate, the Year 2000 problem deals primarily with dates. Thus field names and variable names containing the word "date" or data formatted as a "date" data type represent logical candidates for applying a windowing or expansion enhancement. However, members given entirely different names may be based, in part, upon "date" fields or variables. Thus these members may also need to be similarly enhanced (such as by windowing or expansion). These members may, in turn, supply data to still further members. Thus the enhancement of a "date" field in one member can readily have a geometrically increasing impact.

The present invention offers a tightly integrated solution to the general problem of effecting change in a complex software system. The reconfiguration engine copies or installs the original source code objects to a collection of working directories, where the installed objects are then analyzed. The analysis uses a lexicon of relevant key words to identify where at least some of the subject variables (e.g. date) are used. The lexicon is user-modifiable.

The reconfiguration engine constructs a repository, in the form of a data store into which key information about the source code and the change operations are recorded. Many of the other modules and subsystems of the reconfiguration engine access this repository to read information about the installed source code and/or to write information that will ultimately be used in the reconfiguration process.

The reconfiguration engine includes a tagging module or subsystem that generates keyword tags that are associated with the relevant variables being changed. These tags function as action codes that ultimately determine what type of change action is applied to the variable tagged. The action codes also record a confidence level associated with each tagging decision. Tags based on known keyword identity are assigned a high confidence level, whereas tags inferred by reference to other tags are assigned a lower confidence level. The tagging subsystem may operate in two modes, an interactive mode and a batch mode. The user may readily select between these two modes. In the interactive mode, each member identified by the tagging module is presented to the user for confirmation before applying the tag; in the batch mode, tags are applied to members that match entities in the lexicon without user confirmation.

Because it may not always be possible to identify all relevant members during the tagging process, the reconfiguration engine includes an impact analysis module or subsystem. This subsystem examines the installed source code at several levels ranging from a local level, examining fields whose values are based on known keyword fields, to a system wide level, examining data flow among installed components of the system, to identify other members that may need to be tagged. Appropriate tags with confidence factors are generated and these are stored in the repository. The impact analysis subsystem uses the tagged keywords of high confidence level to locate additional variables, fields and data objects that are of the same data type as the tagged keywords. These are also tagged and stored in the repository. Impact analysis insures that the entire source code and associated components of the system are thoroughly checked to identify members that will be affected by the change. The impact analysis subsystem generates a report, describing those source code objects that need further processing by the tagging subsystem.

Once all pertinent members have been tagged, the source change or code renovation module or subsystem is employed. This subsystem uses a master template to apply actual source code changes to the installed source code based on previously generated tags stored in the repository. The master templates are user-modifiable. They represent the precise changes that the source change subsystem applies to the installed source code.

The reconfiguration engine may also include a code generator that converts the tagged source code produced by the source change subsystem into fully updated source code, complete with all associated code components. The updated source code may then be compiled and substituted for the pre-modification executable code.

In addition to renovating source code, the reconfiguration system also will renovate the data stored by the system being reconfigured. An unload/reload or data renovation module or subsystem performs this function.

The reconfiguration engine of the invention enables a high level of automation and supports multiple software platforms. It will handle large volumes of code and data, even if distributed through multiple systems and across shared entities. The repository-based system allows work groups to share responsibilities or subdivide a large reconfiguration problem into different work-related tasks.

The reconfiguration process made possible by the invention is a unique hybrid of interactive (semi-automated) and batch (fully-automated). A step-by-step, iterative refinement allows high volumes of code to be managed with a high degree of rigor. The system provides an audit trail of all changes.

For a more complete understanding of the invention, its objects and advantages, reference may be had to the following specification and to the accompanying drawings.

BRIEF DESCRIPTION OF THE DRAWINGS

FIGS. 7–16 depict examples of the presently preferred user interface employed by the reconfiguration workbench.

DESCRIPTION OF THE PREFERRED EMBODIMENT

The Reconfiguration Process

The presently preferred embodiment of the invention is a software reconfiguration workbench that uses the reconfiguration engine to automate the principal steps of the software reconfiguration process according to the method of the invention. Before presenting a detailed description of the preferred software reconfiguration workbench and underlying engine, an overview of the reconfiguration process will be presented.

Figure 1:
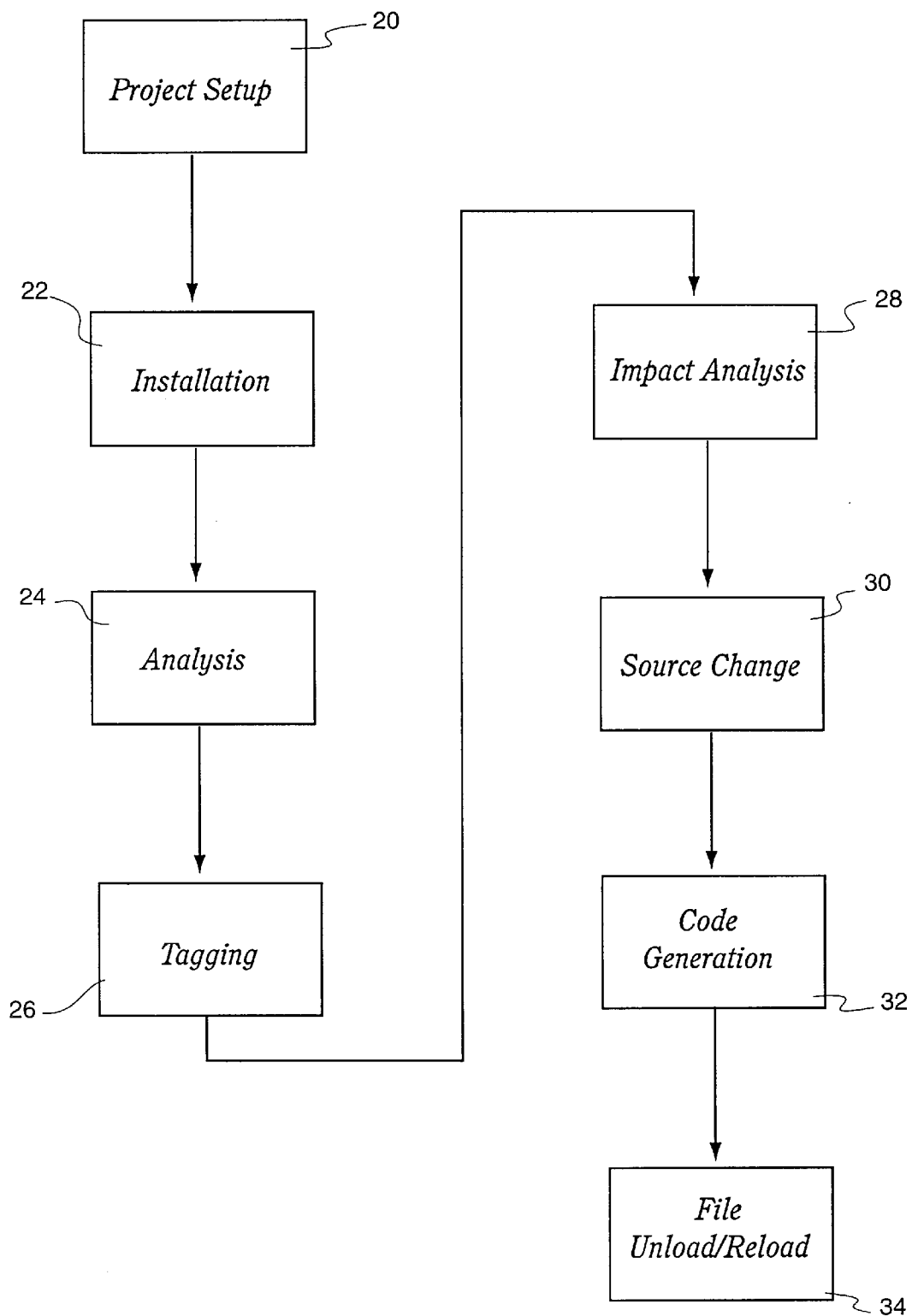
FIG. 1 is a flowchart diagram showing the principal steps performed in accordance with the reconfiguration process of the invention.

Referring to FIG. 1, the reconfiguration process involves a collection of different processing operations. Although FIG. 1 illustrates these operations as serial or sequential, this illustration is not intended as a limitation of the invention in its broader aspects. Specifically, as will be described, some of the processes are performed interactively with one another or in parallel and may involve several interactive iterations.

To begin a software reconfiguration process the first step is project setup 20. It is in this step that the project administrator will define the working names and descriptions to be used during reconfiguration, and to define the working location of pertinent files, file servers, databases and the like. During the project setup 20, the administrator may also define users that are authorized to work on specific aspects of the reconfiguration. Essentially, these steps involved in the project setup 20 define the basic environment in which the software reconfiguration will be performed.

Project setup 20 also involves creation of an important file structure known as the "repository." The repository consists of a plurality of different data stores that keep track of the key data values needed to perform the reconfiguration process. Other operations populate this repository and manipulate its values. Ultimately, the information stored in the repository is used to make the necessary software changes required for the reconfiguration.

Generally after project setup operations 20 have been completed, the installation operations 22 are commenced. Installation involves actual source code analysis in which source code components are analyzed line by line to identify the object type of each source code component and also to identify object references (where other components are called or referred to). Thus the installation operation involves identifying all called programs and all copybooks referenced.

The results of this source code analysis are stored in a portion of the repository and used to create a "where used" record for each source code component. The installation operations 22 thus begin to populate portions of the repository.

Also during the installations operations the reconfiguration workbench builds the required standard working directories. In general, a reconfiguration project can be quite complex, and the workbench automatically constructs a predetermined configuration of working directories that are used to store intermediate and final results. One advantage of this approach is that the original source code is never changed. The original source code is instead copied into certain working directories where the reconfiguration workbench operates upon the copy.

As noted above, the software reconfiguration workbench is designed to support an iterative, rapid refinement reconfiguration technique. Within essentially any operation, the user may repeat steps, or backtrack to preceding operations as reconfiguration proceeds. This is a highly beneficial capability, for it allows the users to continue to refine the reconfiguration model as the processes are being performed.

One example of such refinement is within the installation operation. During installation, the workbench generates reports of duplicate objects and unknown objects. These reports prompt the user to resolve problems by eliminating duplicate objects or by identifying unknown objects. Often the cause of a duplicate object may be traced to a simple error during preceding steps of installation. Likewise, unknown objects may be the result of simple oversight. Using these reports, the user may wish to backtrack to preceding installation steps in order to correct problems associated with object identification.

So far, the workbench has simply cataloged source code objects and linked those objects to where they are actually used in the source code. The analysis operations 24 are then performed to identify the specific lines of code or data elements where a change may be required. Using the workbench to make Year 2000 changes, it is expected that source code lines or data elements referencing a "Date" should be examined for possible change. Of course, as noted above the software reconfiguration workbench has many uses and is not limited to the Year 2000 problem. The workbench would be equally suitable in revising a software system to revise product number formats, change tax rules applicable to financial transactions, change the identity of key fields in relational databases, and the like.

The analysis operations 24 comprise initial steps where the keyword search criteria is established, and subsequent steps where the source code is analyzed to locate the keywords so defined. For the Year 2000 problem, a sensible keyword to begin analysis is the keyword "Date." It is, of course, overly simplistic to assume that the keyword "Date" is the only term that may be affected by reconfiguration. There may be many terms that are, in fact, dates, or based on calculations involving dates, that do not incorporate the keyword "Date" as part of the term.

The analysis operations 24 use information in the repository and lexicon to generate reports alerting the user to portions of the code where decisions may be required. As in the installation operations, the analysis operations include generation of reports that show where all pertinent keywords and components dependent on those keywords are used. The analysis phase thus results in a series of reports giving a good overview of exactly how large the reconfiguration project is.

The tagging operations 26 are where the actual change process begins. Keywords (and other terms associated with those keywords) are tagged so that changes can later be correctly applied. The tagging operations employ a combination of both interactive tagging and batch tagging. Interactive tagging involves the user. The user may select certain keywords that are known to represent source code terms that will require change (e.g. "Date"). Batch tagging is performed automatically by the workbench without requiring user interaction. During batch tagging the workbench identifies terms that match those in the lexicon or previously stored in the repository.

Tagging results in adding further information to the repository. The preferred embodiment encodes each tag with an action code that serves two purposes. The action code indicates what change operation will be performed on the tagged entity. In the case of a Year 2000 problem, the tagged Date entity may be expanded (one action code) or windowed (a different action code). The action codes also serve to identify a degree of certainty in the tagging decision. Entities whose names match previously identified keywords are tagged with an indication of high certainty; entities tagged because of reference to a known entity are tagged with an intermediate certainty. Specifically, entities known to be identified keywords are tagged with a "high-confidence" tag; entities that refer to or are based on high-confidence entities are tagged with a "medium-confidence" tag; and entities that refer to or are based on medium-confidence entities are tagged with a "low-confidence tag." only high-confidence entities are added to the attribute table. Medium-confidence and low-confidence entities must first be examined by the user, who can determine if the entities are, in fact, properly tagged for change (i.e. date-related fields in the Year 2000 context). Those the user determines are properly tagged may then be tagged as high-confidence entities and added to the attribute table.

After tagging operations, impact analysis operations 28 are generally performed next. Whereas analysis operations 24, and the tagging operations 26 focus on individual keywords and individual entities within lines of source code, impact analysis involves a more global view in an effort to discover other entities that may need to be tagged. During impact analysis the entire system, as represented by the installed source code, is analyzed from a data flow standpoint. For a given list of attributes, the workbench analyzes how data flows through the entire system. From this analysis the workbench produces a list of tags that have been unambiguously assigned, as well as a list of tags that remain unresolved. Looking at data flow through the entire system helps single out entities that were overlooked during previous analysis and tagging operations. Based on the results of impact analysis, the user may backtrack to repeat some of the preceding steps (such as analysis operations 24 and tagging operations 26) until there are no unresolved data tag entities remaining.

Impact analysis in the presently preferred embodiment is performed at multiple levels. At the local level, individual fields are examined to determine those that receive data from or send data to high-confidence tagged entities. At a somewhat higher level, an area analysis is performed to identify those sections of program code or program areas that send data to or receive data from areas containing high-confidence entities. At a still more global level, a file analysis is performed, to identify files that communicate data with other files known to contain high-confidence entities. Finally, a code analysis is performed to identify any section of code that has not been previously referenced. The code analysis will identify those potentially problematic regions of code that cannot be automatically renovated.

Using the information stored in the repository, source change operations 30 may be commenced when most or all of the entities have been tagged. The source change operations involve accessing the repository to identify tagged entities (high-confidence entities) and to apply the proper changes based on the tags. The source change operations involved use of previously defined source change templates known as code masters. In the Year 2000 problem one code master might be provided for field expansion and a different code master provided for field windowing. Different code masters would also typically be provided to support different programming languages. Thus the source code changes would be effected by templates written in the language of the original source code.

The source change operations 30 result in updated source code, in which the replaced source code is retained in comment fields to provide an audit history. The code generation operations 32 may then be performed on the updated source code to generate the renovated source code for compiling on the target computer to generate new executable code. Similar revisions are made to the data in order to conform the data to any revised data formats. This data renovation or unload/reload operations 34 are performed using masters to expand data as needed.

The Reconfiguration Engine Architecture

Figure 2:
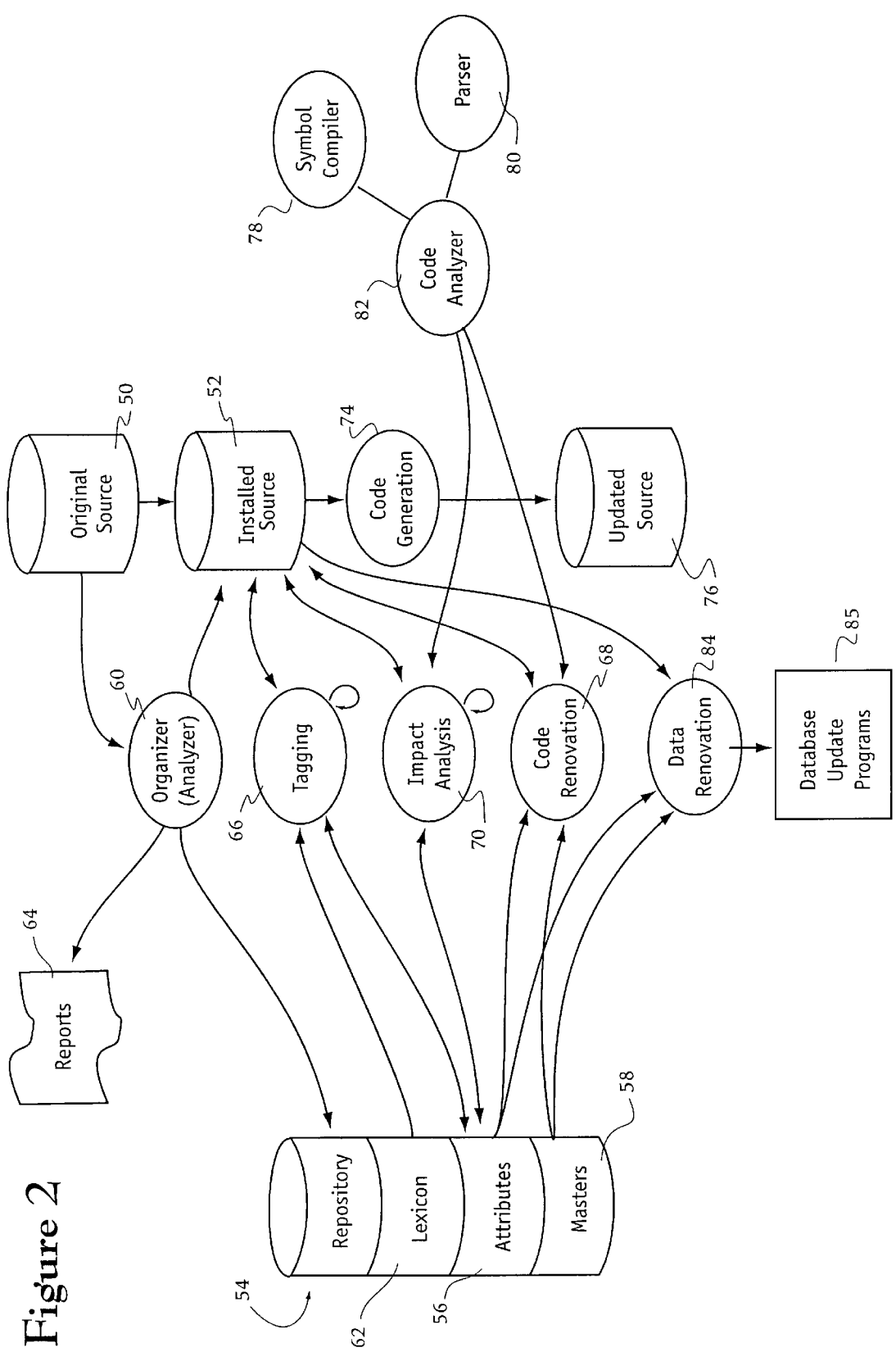
FIG. 2 is a block diagram illustrating the presently preferred software architecture of the reconfiguration engine.

FIG. 2 shows the architecture of the software reconfiguration engine. More specifically, FIG. 2 is a data flow diagram illustrating how the different workbench components interact with one another. The original source code is shown at 50. A copy of the original source code is stored at 52, representing the installed source code upon which many of the other workbench components operate. In the presently preferred embodiment the installed source code is copied from original source code 50 during the installation operations 22.

Figure 3:
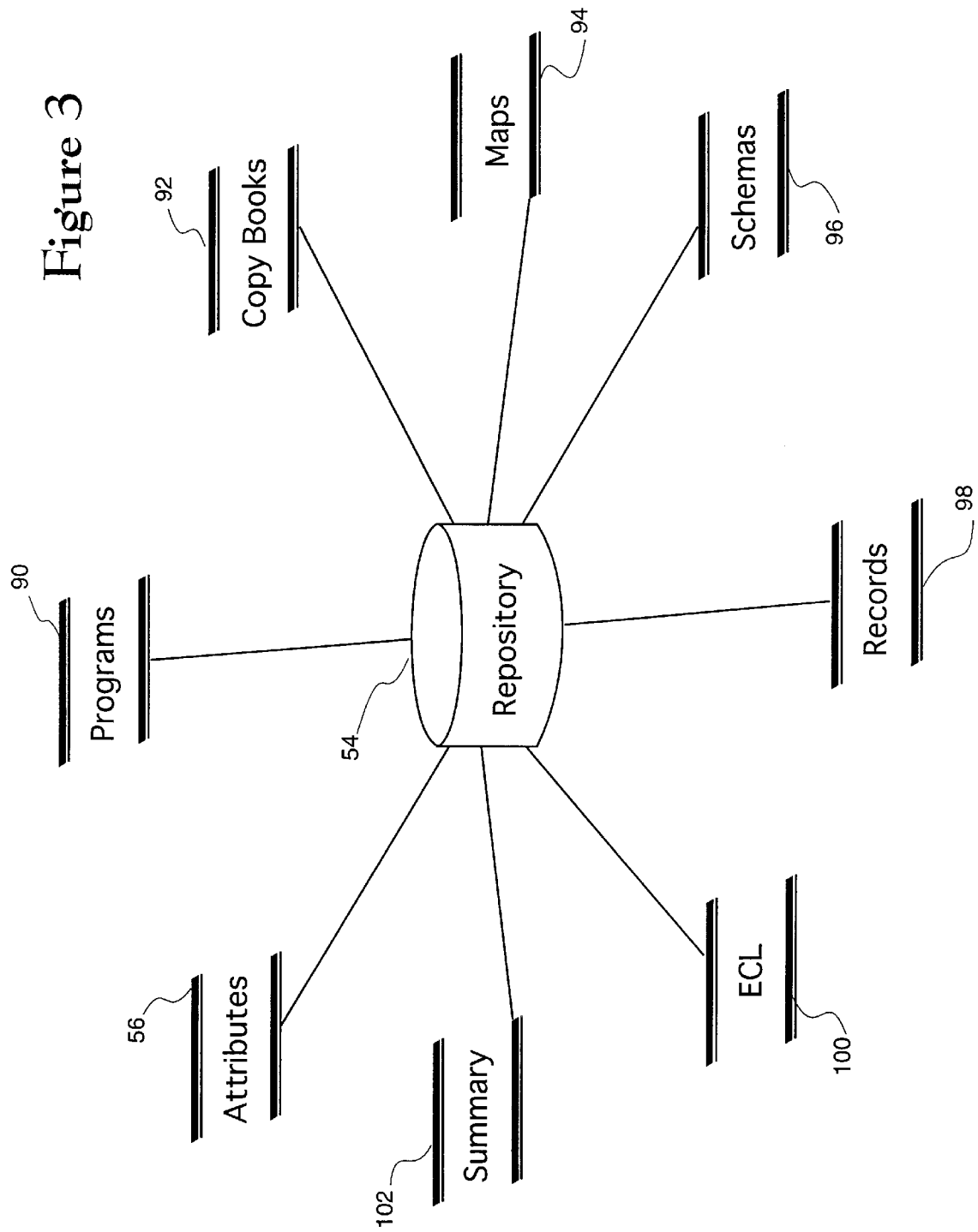
FIG. 3 is a data structure diagram showing the configuration of the repository data structure used by the reconfiguration engine.

The repository 54 serves as the primary data store for many of the workbench components. The repository comprises a set of individual tables used for storing different kinds of information. The preferred repository configuration is shown in FIG. 3. The attribute table 56 of repository 54 has been specifically illustrated in FIG. 4. The attribute table is where data tags are stored in the preferred implementation. Also illustrated in FIG. 2 is the master template data store 58 which comprises another part of repository 54 and the lexicon 62.

The presently preferred workbench may employ individual processing modules or components to perform the operations illustrated in FIG. 1. The organizer or analyzer module 60 performs the analysis operations 24 (FIG. 1). It accesses the installed source code 52 and uses a predefined lexicon 62 of keywords to generate a summary report 64 showing what needs to be changed as a general indication of the "level of effort" needed to reconfigure the code.

The tagging module 66 performs the tagging operations 26 (FIG. 1). As indicated, the tagging module includes both interactive and batch capabilities. The tagging module accesses the installed source code 52 and also lexicon 62. It populates attribute table 56 with tags associated with the entities found in source code 52. The tagging module 66 tags each entity identified in the source code, according to: (a) what type of change is indicated for that entity based on the lexicon; and (b) whether the tag is unambiguously established or not. The preferred embodiment uses a tag format depicted in FIG. 4.

Impact analysis module 70 inspects the source code while accessing the attribute table 56, to determine if there are any unresolved entities needing to be tagged. The impact analysis module generates a report of unresolved tags. The analysis, tagging and impact analysis operations may be performed numerous times until the installed source code 52 contains no further unresolved entities as shown in FIG. 2.

Figure 5:
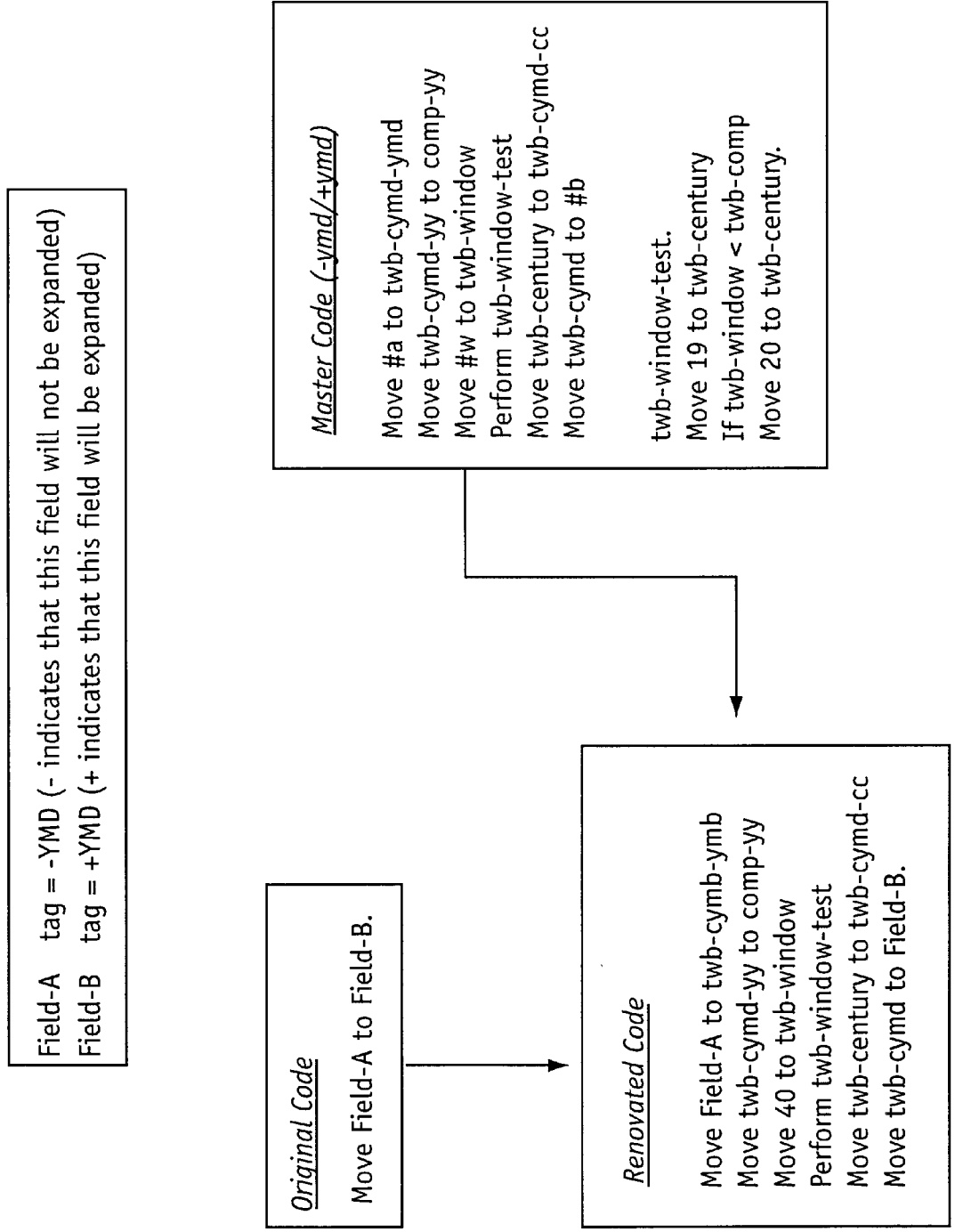
FIG. 5 illustrates how a code master is applied to a selected source code entity based on the tag.

The source change or code renovation module 68 accesses the attribute table to determine which source code entities must be changed. Code renovation module 68 then accesses the master template data store 58 to acquire the proper master and then apply it to the installed source code 52. FIG. 5 illustrates an example of how a code master would be applied to the selected source code, based on the tags indicated in the attribute table.

Impact analysis module 70 and the code renovation module 68 employ the services of a code analyzer 82. The code analyzer 82 employs a symbol compiler 78 and parser 80.

In a fashion similar to the code renovation module, the data renovation module 84 accesses the attribute table 56 and the master template data store 58 to generate updated data, based on the tags. The data format may be expanded or otherwise changed according to the rules specified by the master, resulting in newly formatted data that is then stored in the system database 85.

The Repository

Referring to FIG. 3, repository 54 comprises a number of different data stores, each dedicated to storing different kinds of information. Already introduced in reference to FIG. 3 is the attribute table 56. The attribute table is a data store in which tag values for fields are recorded and then used in generating the updated source code.

Proceeding clockwise from the attribute table 56, programs data store 90 stores all programs (both on-line and batch programs). In addition, the programs data store of the preferred embodiment also stores additional information describing certain system-level information about the source code. Table I gives a listing of the information stored in the programs data store 90.

TABLE I

| | PROGRAMS |
|---|---|
| System | the system name is the system, as defined on the install options screen, that the object was installed from |
| Program Name | the internal name of the object (the actual name not the DOS name) |
| Source file name | the file name as found in the system directory when installed. The directory path is where the install process placed the object in the project directory structure. |
| Lang. Type | the source code language |
| B/O | the batch or on-line identification |
| #Lines | the number of source lines in the object |
| #DBMS | the number of DBMS commands found in the object during the analysis |
| #Dates | the number of dates found in the object during the analysis |
| #Custom | the number of string hits during the analysis |

Continuing to proceed clockwise in FIG. 3, next is the copybooks data store 92. In this repository all copybooks, source code header files and the like are stored. Some readers will appreciate that the copybook designation corresponds to terminology used in Cobol systems. The adoption of this nomenclature is not intended as a limitation of the invention to only Cobol programs. On the contrary, the invention can be used with essentially any source code-based programming language.

In addition to storing all copybooks, the copybooks data store also records the information listed in Table II.

TABLE II

| | COPYBOOKS |
|---|---|
| System | the system name is the system, as defined on the install options screen, that the object was installed from |
| Copybook name | the internal name of the object (the actual name not the DOS name) |
| Source file name | the file name as found in the system directory when installed. The directory path is where the install process placed the object in the project directory structure. |
| Lang. | the source code language |
| Type | the type of copybook indicator field. C = working storage; P = procedure code copybook |
| #Lines | the number of source lines in the object |
| #DBMS | the number of DBMS commands found in the object during the analysis |
| #Dates | the number of dates found in the object during the analysis |
| #Custom | the number of custom string hits during the analysis |

The maps data store 94 stores all maps used by the system. Again, although a Cobol terminology is used here, no limitation is intended. In addition, the maps data store records the information identified in Table III.

TABLE III

| | MAPS |
|---|---|
| System | the system name is the system, as defined on the install options screen, that the object was installed from |
| Map name | the internal name of the object (the actual name not the DOS name) |
| Source file name | the file name as found in the system directory when installed. The directory path is where the install process placed the object in the project directory structure. |
| Type | the type of map indicator field. (e.g., DPS1100 = Unisys screen) |
| #Lines | the number of source lines in the object |
| #Dates | the number of dates found in the object during the analysis |
| #Custom | the number of custom string hits during the analysis |

The schemas data store 96 stores all schemas, sub-schemas describing the databases employed by the system being reconfigured. Typically, schemas are applicable to database management systems (DBMS). In systems that do not contain a DBMS or in systems that use simple flat file databases, the schemas data store will be left blank. In addition to storing all schemas and sub-schemas, this data store also stores the information listed in Table IV.

TABLE IV

| | SCHEMAS |
|---|---|
| System | schemas are not tied directly to a system since schemas could cross application systems. This is why there is not a system column in this table. |
| Schema name | the internal name of the object (the actual name not the DOS name) |
| Source file name | the file name as found in the system directory when installed. The directory path is where the install process placed the object in the project directory structure. |

TABLE IV-continued

SCHEMAS

| | |
|---|---|
| Type | the type of schema. (e.g., DMS1100 = Unisys; IDMS = IBM IDMS) |
| #Lines | the number of source lines in the object |
| #Dates | the number of dates found in the object during the analysis |
| #Custom | the number of custom string hits during the analysis |

The records data store 98 stores all schema and sub-schema record names. When the schema is installed during the installation operations 22 (FIG. 1), the record names are added to the record table in this data store. The installation operations also create working storage for copybooks for each record. This is done to facilitate use with database systems such as DMS 1100 and IDMS, in which record layouts are brought into the program through schema and sub-schema statements. The name of the generated copybook is stored in one column of the table comprising the Records data store. In additions the records data store records the information identified in Table V.

TABLE V

RECORDS

| | |
|---|---|
| Record name | the record name is the record name as stated in the schema/sub-schema |
| Type | the type of schema. (e.g., DMS1100 = Unisys; IDMS = IBM IDMS) |
| Referenced by | this field is the name of the schema and or sub-schema that contains the record name identified in the first column |
| Ref Type | the reference type indicator is the source identification. S = Schema; B = Sub-Schema |
| Member name | the member name is the name of the working storage copybook generated for the I/O area of a program. The copybook is used in the impact analysis and other year 2000 functions (see date tagging). The RECS directory is created to contain the generated record copybooks. |
| #Lines | the number of source lines in the object |
| Select name | |
| DSN Seq# | |
| #Dates | the number of dates found in the object during the analysis |
| #Custom | the number of custom string hits during the analysis |

The ECL (Execution Control Language) data store 100 stores all procedures used by the system being reconfigured. In addition, the following information listed in Table VI is recorded.

TABLE VI

ECL

| | |
|---|---|
| System | the system name is the system, as defined on the install options screen, that the object was installed from |
| ECL Name | the name of the object |
| Type | the type of procedure. J = a; Others = b |
| #Lines | the number of source lines in the object |
| Source file name | the file name as found in the system directory when installed. The directory path is where the install process placed the object in the project directory structure. |

TABLE VI-continued

ECL

| | |
|---|---|
| #Dates | the number of dates found in the object during the analysis |
| #Custom | the number of custom string hits during the analysis |

The summary data store 102 is used to store information needed to provide a quick summary of the installed system. The information contained in this data store may be presented in a suitable summary screen that the user can refer to determine the count of objects that have been installed and objects that have not. The presently preferred implementation records the information shown in Tables VIIa and VIIb.

TABLE VIIa

TOP LINE (columns)

| | |
|---|---|
| System | the system name or "all" that has been selected for viewing (see System Name) |
| Objects Installed | this column contains the total number of objects installed, for the selected system and object type |
| Lines | this column contains the total number of lines for the installed Objects |
| Not Installed | this column contains the total number of objects that were referenced but not installed |

TABLE VIIb

ROWS

| | |
|---|---|
| SCHM: Schemas | the numbers for data base definitions (IDMS. DMS1100) |
| SSCH: Subschemas | the numbers for data base subschema definitions (IDMS. DMS1100) |
| BTCH: Batch pgms | the numbers for the batch programs found |
| ONLN: On-line pgms | the numbers for the number of on-line programs found |
| MAPS: Maps | the numbers for the number of internal screen definitions found |
| CPBK: Data Copybooks | the numbers for the working storage copybooks |
| PCBK: Proc. Copybooks | the numbers for the procedural code copybooks |
| ECL: ECL | the numbers for the execution control language/procedures |
| Totals: | the total for each column; Objects installed, Lines and Not installed |

Figure 4:
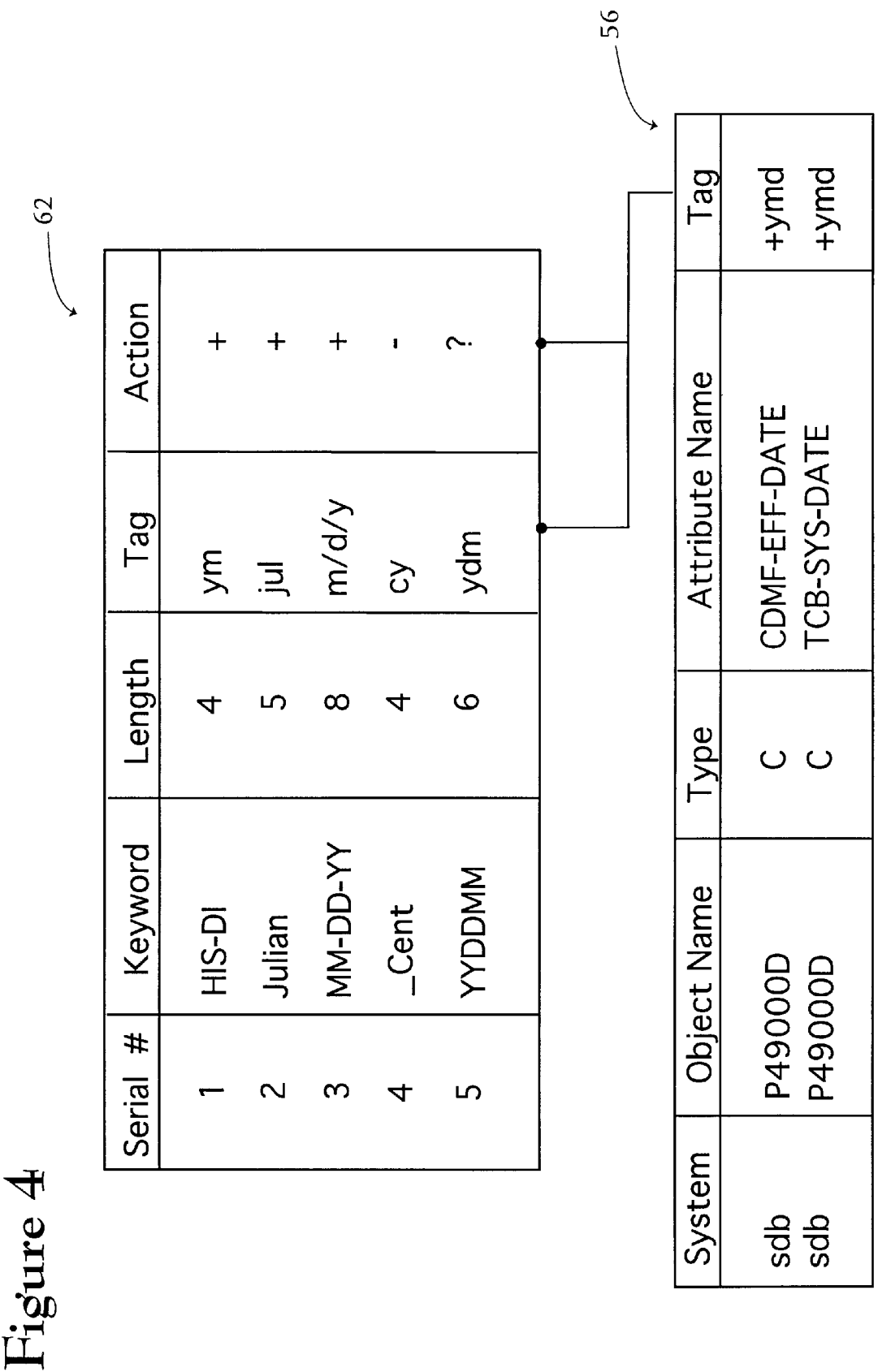
FIG. 4 is a data structure diagram showing the presently preferred tag format and illustrating the lexicon and attribute table layouts.

FIG. 4 shows the data structure of the attributes data store 56 and gives two example records. The System column stores the name of the system that the object was installed from. System names are input during the installation operations 22 (FIG. 1). The Object Name stores the name of the object in which the keyword attribute is found. The Type field stores the type of object. In the examples C indicates the type of object as "copybook." The Attribute Name store the field name found with a valid tag during the tagging process. These are the actual variable names used in the program to describe entities that are subject to change. (In a Year 2000 application these attribute names would typically refer to dates). Finally, the Tag field stores the tag value found during the tagging process. In the examples both have been designated +ymd. This indicates that the respective attributes are of a year-month-day type (as defined by the user or system administrator). The plus sign (+) indicates that the field should be expanded during the source change operations. A minus sign (–) would indicate that the fields are not to be expanded. These are referred to as "action codes."

FIG. 4 also illustrates the data structure of lexicon 62. The lexicon 62 stores unique keywords with certain information about those keywords. The lexicon is user-definable. Thus a user can add, delete or modify keyword entries found in the lexicon. This is done during the analysis operations 24 (FIG. 1).

In addition to a serial number that establishes the unique identity of each record in the lexicon, the data structure includes a Keyword column in which known keywords are stored.

These are the keywords that will be searched for in the source code during the tagging operations 26. The data structure also stores each keyword's Length, Tag and the Action to be taken. The Tag and Action codes are the same as those used in attribute table 56. However, for convenience to the user, the Tag and Action codes are presented as separate columns in the lexicon. These columns may be readily concatenated to produce the Tag format used in attribute table 56.

Figure 6:
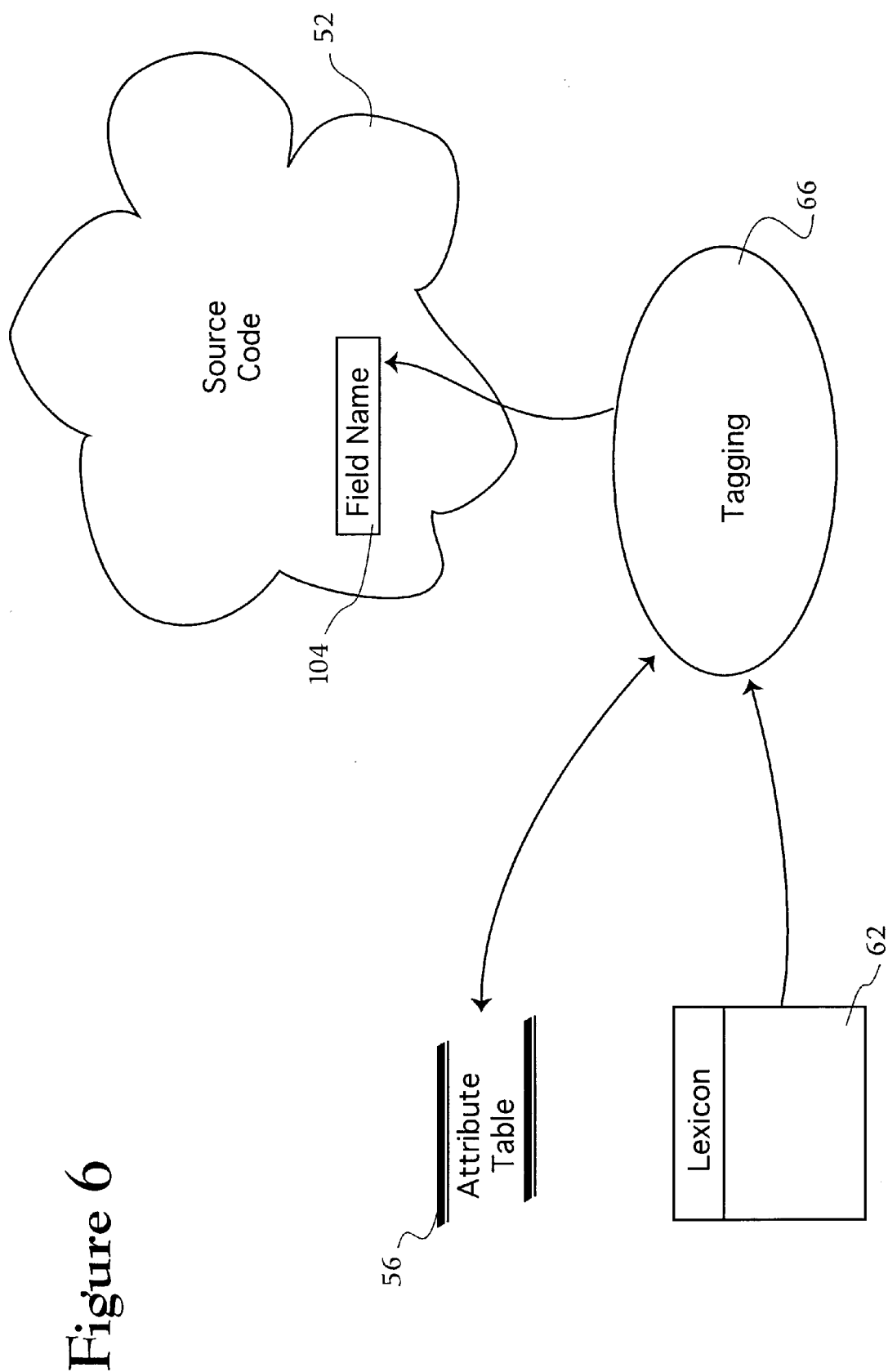
FIG. 6 is a data flow diagram illustrating details of the tagging process.

Referring to FIG. 6, when the tagging module 66 is invoked by the user, the installed source code 52 is inspected, line by line. Specifically, field names, such as field name 104 are compared against attribute table 56. If a match is found, that field name is tagged in the source code, using the tag label designated in attribute table 56. Thereafter, the tagging module compares source code 52 with all entries in lexicon 62. If a match is found, the matching field name is tagged using the Tag and Action codes designated in the lexicon.

The tagging module 66 looks for field name matches in the attribute table first. Thereafter, if no match is found, the tagging module uses a string search method to identify matches with entries in the lexicon.

Reconfiguration Workbench User Interface

The reconfiguration workbench provides a convenient way for the user to perform the reconfiguration process in accordance with the present invention. The architecture of the underlying reconfiguration engine has been described above. A description of the presently preferred user interface will now be presented. It will, of course, be recognized that the invention is capable of being deployed in a number of different arrangements and certain aspects of the user interface are a matter of design choice. The presently preferred user interface will be described here.

Figure 7:
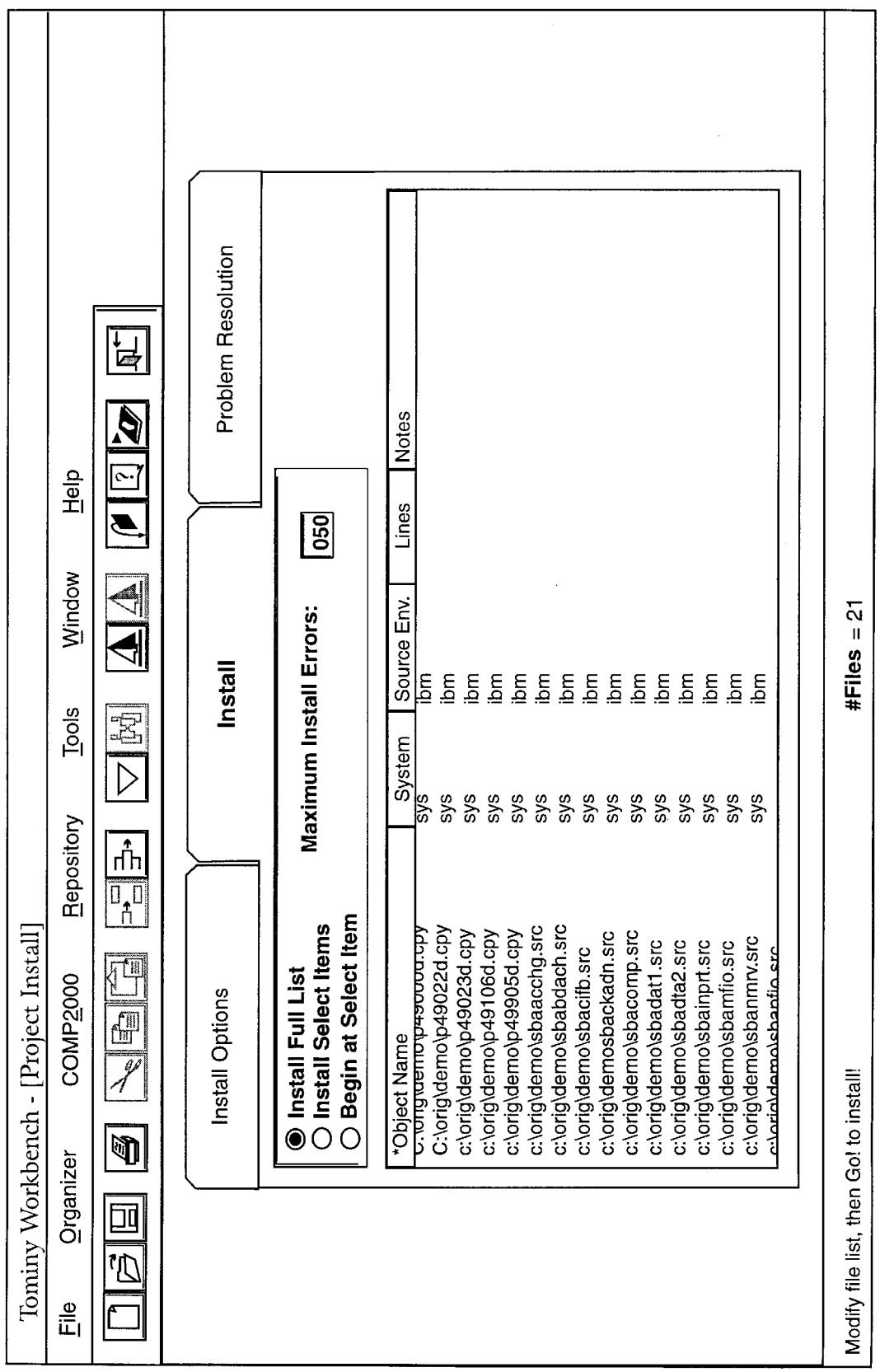
Figure 8:
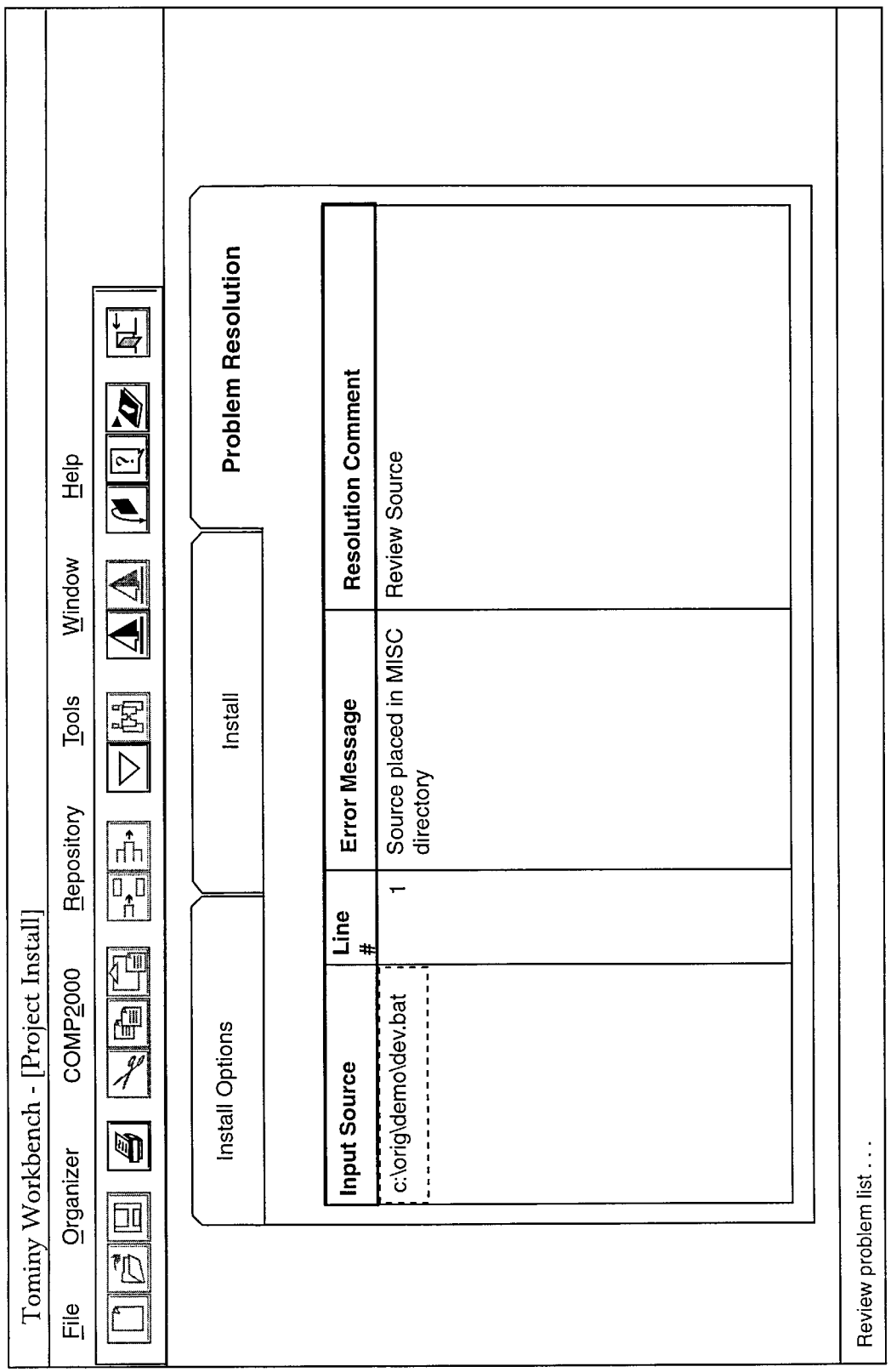

The installation process (operations 22 in FIG. 1) involves reading the original source code, identifying the type of objects that the source code comprises and placing those objects in the correct project directories. FIG. 7 shows the preferred user interface for performing the installation process. The Project Install window presents a list of objects identified by the reconfiguration workbench. The user can select from several options. The user may install the full list; install selected items in the list by highlighting them with the mouse; begin installation at a selected item; or install with a limit upon the maximum number of errors encountered. The maximum number of errors is a user adjustable parameter used by the system to stop the installation process after the number of errors exceeds the entered value. Objects that do not install, or that are not recognized by the reconfiguration workbench are listed as problems in the problem resolution folder illustrated in FIG. 8. The problem resolution folder will identify the type of error that occurred during installation and presents an error message along with a resolution comment that can be helpful in resolving the installation problem.

The reconfiguration workbench during the installation process reviews every line of code that is delivered. The system checks every program for other programs that are called by that program, all copybooks used, all maps used and every ECL implicated.

Generally speaking, source code libraries are often the most poorly maintained part of an application environment. Source libraries tend to have duplicate copies of the same source module under different object names. Temporary code may be found in the libraries, as skeleton programs when a programmer begins coding a program from scratch. These types of problem areas are identified by the reconfiguration workbench during installation.

Figure 9:
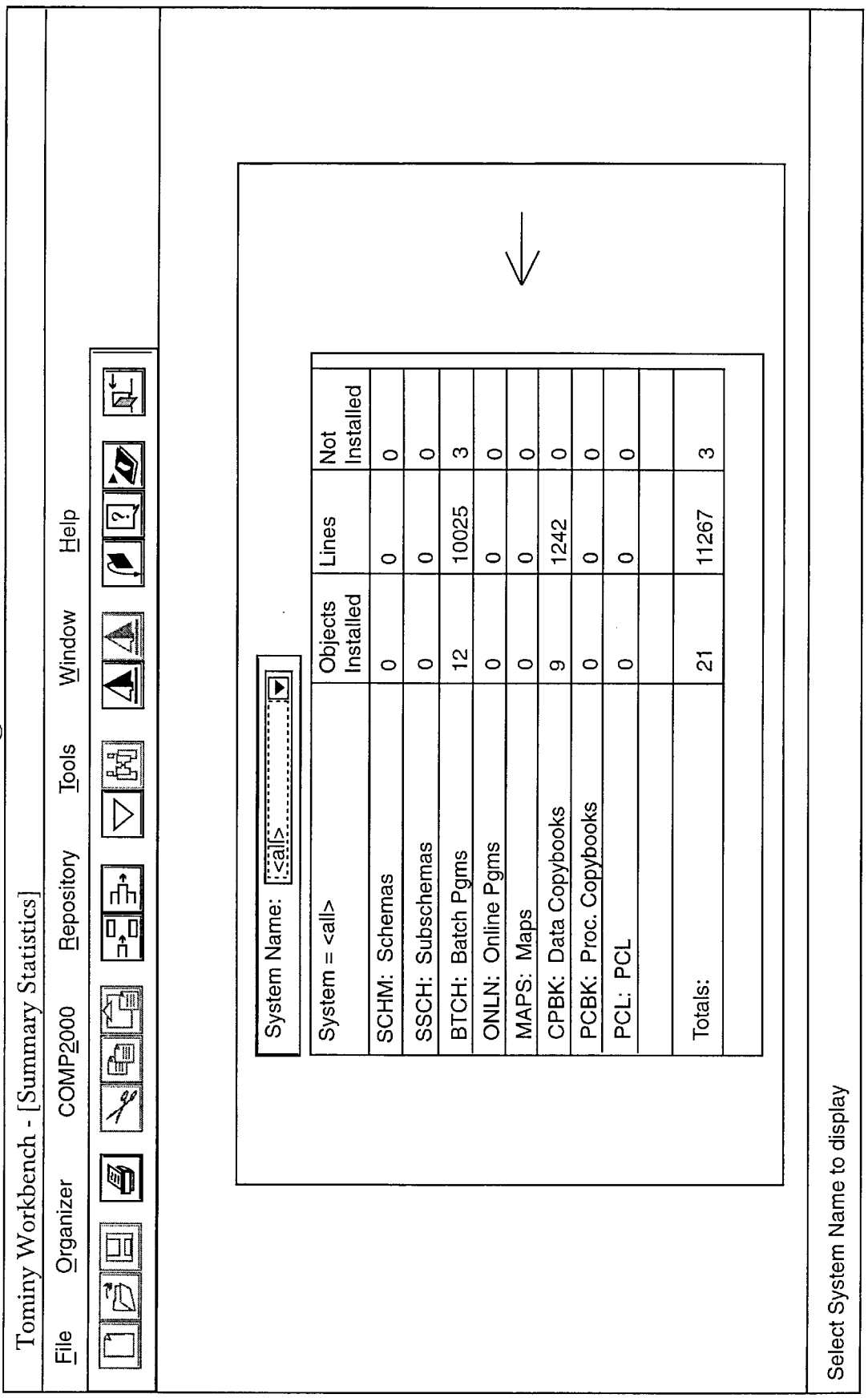

After the installation has completed, the user may select a Summary Statistics report window shown in FIG. 9. The Summary report is contained in a folder that lists statistics on the objects that were installed, as well as those that were not installed. This is in invaluable report in making sure that the entire source code will be subjected to the reconfiguration process.

After all objects have been identified and properly installed, and all problems have been dealt with, the project analysis operations (operations 24 in FIG. 1) may be performed. Project analysis generally involves generating detailed reports that show the size and complexity of the reconfiguration project. These reports are useful, for example, in determining how much time and human resource should be allocated to the reconfiguration project. An example of a project analysis user interface screen is shown in FIG. 10. FIG. 10 is specifically directed to the DATE criteria, applicable to a problem such as the Year 2000 problem. The DATE report illustrated is based on the list of date keyword strings in the Date Keyword column. The analysis program reads through all of the source code requested and looks for keywords listed in this column. Importantly, the analysis program reviews only objects that the user has requested. On the lefthand side of the screen the user may select the type of objects to be reviewed, such as copybooks, maps, schemas, or all of the above. The results of this report are stored to a file on the computer system disk at a file name specified by the user. Note that this date keyword list (or lexicon) is the same that is used in the tagging operations. So that the user is able to readily determine that the keywords are being properly handled, the report also displays the applicable data field Length, the applicable Tag, as well as the attribute (Actn) designating the degree of confidence in each tagging decision.

Although a Date keyword is analyzed in this example, the invention is readily extended to other types of keyword analysis (for reconfiguration on the basis of entities other than dates). The preferred user interface provides a Custom Criteria folder that the user can employ for entering custom keywords unrelated to the primary keywords handled by the system.

Figure 11:
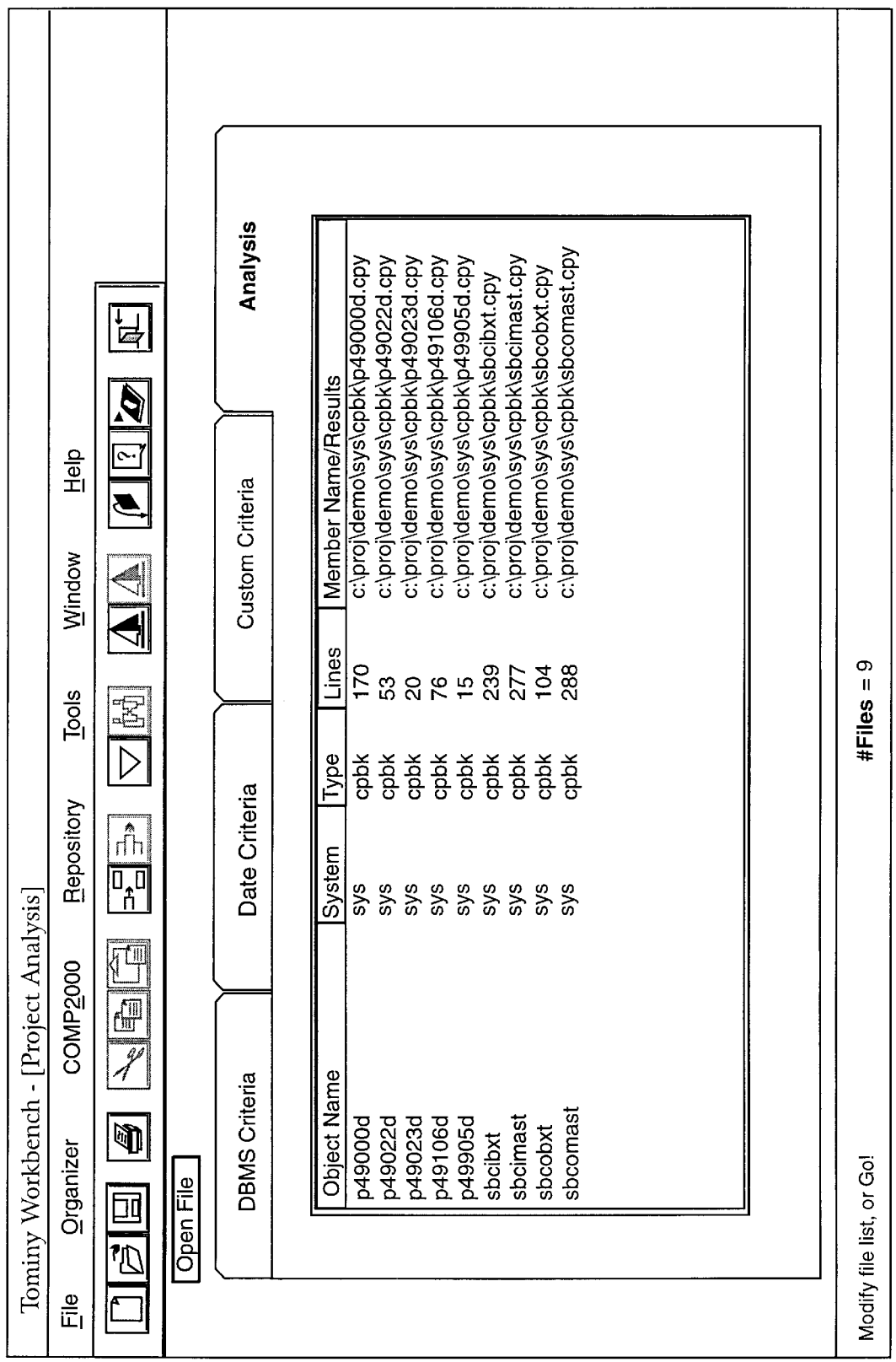

Once the user has selected an analysis option from those listed in the window of FIG. 10, the workbench opens the selected files (copybooks, programs, etc.) for the chosen options and performs the analysis. An exemplary report of such analysis is shown in FIG. 11.

Figure 12:
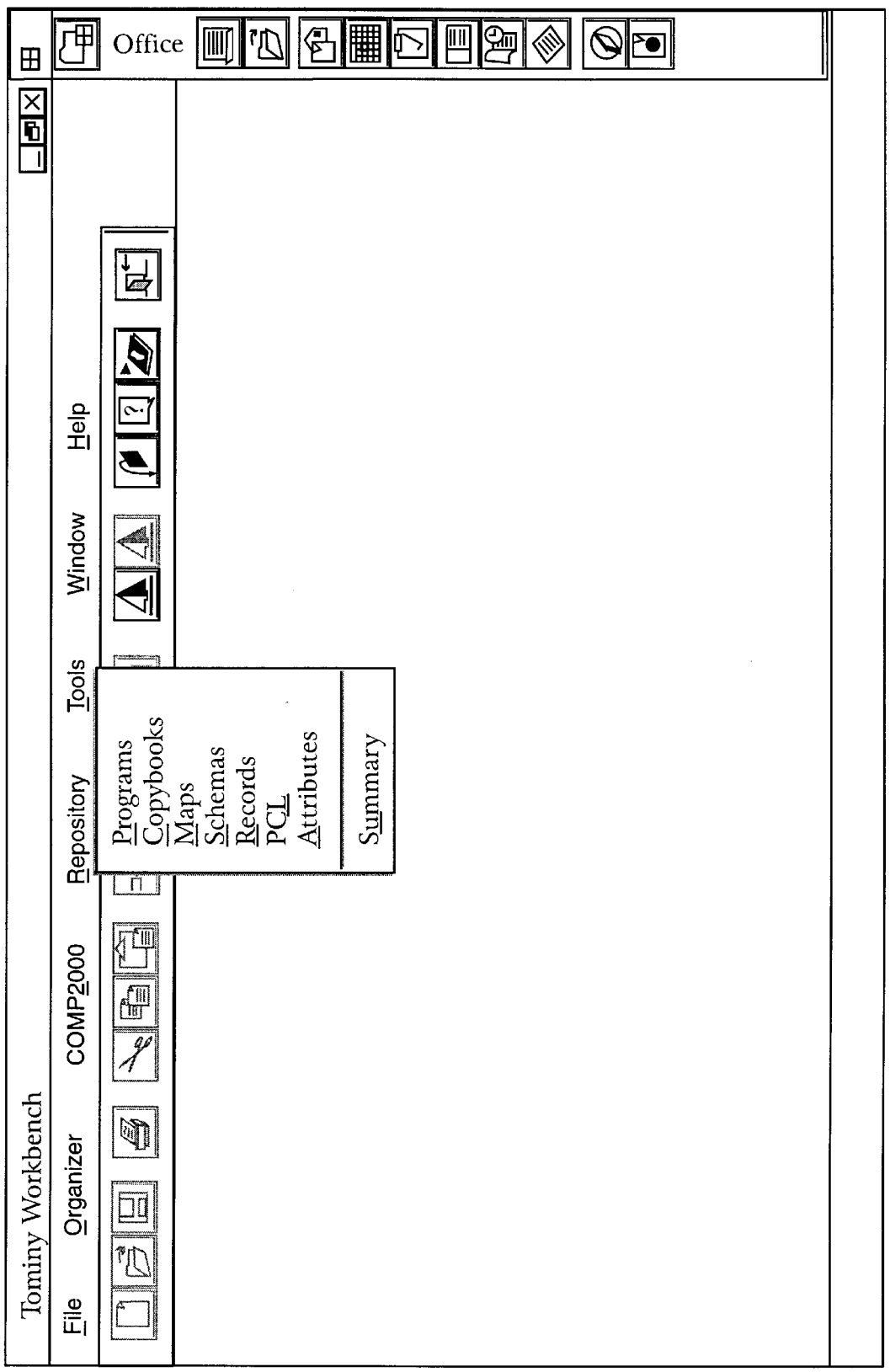

The Repository is designed to be a "where used" inventory. During the installation process, the repository is populated and any errors are reported. The user can inspect the actual contents of the repository by selecting from a menu as illustrated in FIG. 12. By way of example, FIG. 13 shows what the attribute table might look like when that menu item is selected from the repository heading.

Figure 14:
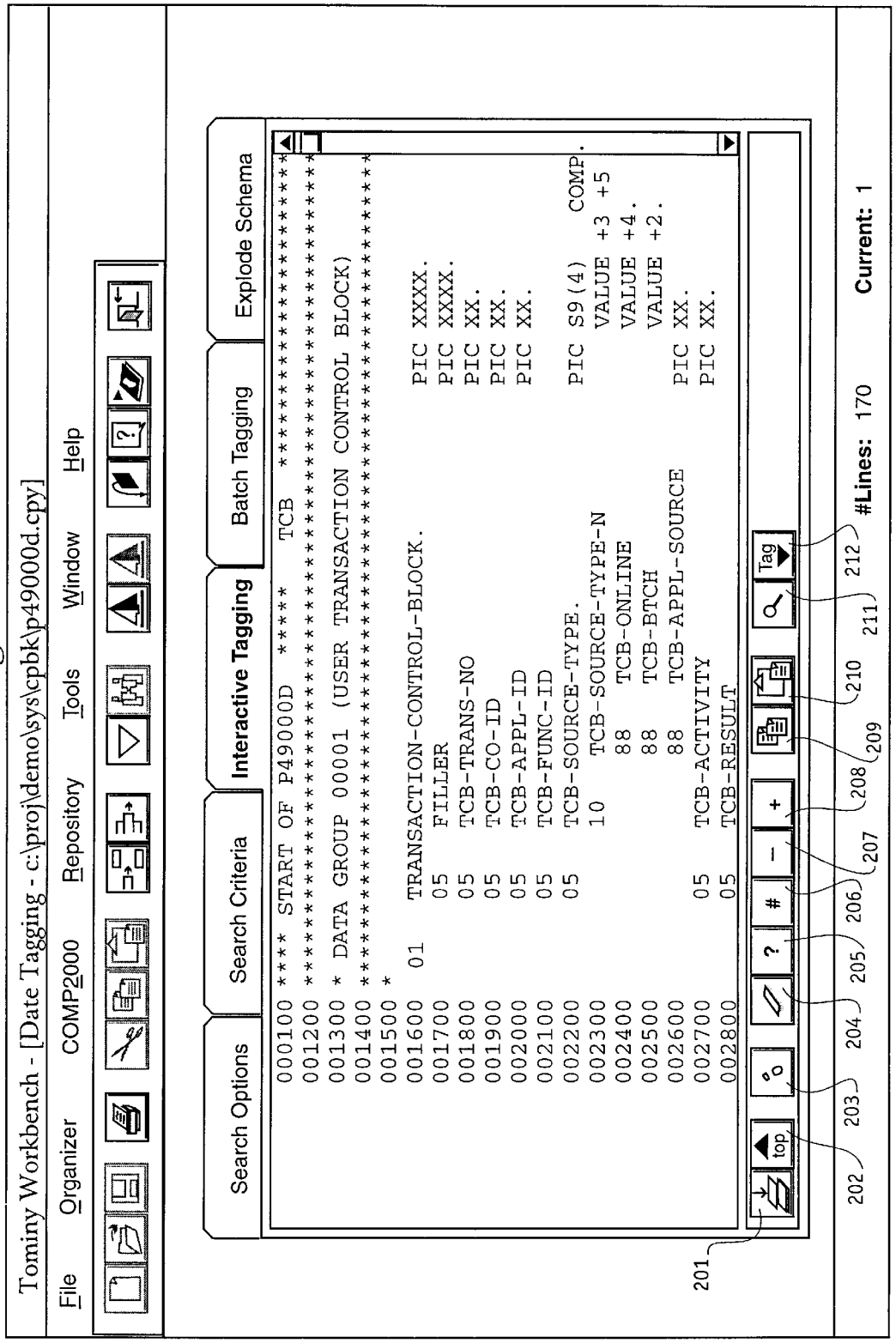

As previously noted, the tagging operations are performed either interactively or in batch fashion. FIG. 14 presents an example of interactive tagging for an exemplary portion of code. The user interacts with this screen by activating the buttons or icons on the tool bar located at the bottom of the screen. Icon 201 is used to open the next file, when multiple files have been opened during the open file process. If this icon is clicked and the file currently displayed has changed, a series of questions prompt the user to save changes to the current file. Icon 202 sends focus back to the top of the object being displayed. Icon 203 effects a toggle between the interactive mode and the batch mode. In the interactive mode, the tagging processor stops each time it finds a match upon either the lexicon or the attribute table. By stopping, the user may review the tags in true interactive fashion. This is the recommended procedure for a new user first learning to use the workbench. In the batch mode the tagging processor will not stop each time a match is found. Rather, the processor will tag each entity in the entire object and then allows the user to go back and review those tags that were made. In the preferred embodiment the icon displays a single foot for interactive mode and two feet for batch mode.

Icon 204 (the eraser) erases a tag that is currently highlighted by the processor. Icon 206 allows the user to place the # tag on the data element highlighted by the processor. Similarly, icons 206, 207 and 208 allow the user to place the ?, - and + tags on the highlighted data elements. The ? tag indicates that additional information is required. The - tag indicates that the field should not be expanded. The + tag indicates that the field should be expanded.

Icon 212 is the "tag" icon that is used to start or continue the tagging process for the selected object. The tagging process continues from the current line and proceeds to the end of the object being processed. Icon 211 is the review icon that is used to start or continue a review process of the tags for the current object. The review process continues from the current line until the end of the object is reached.

Figure 15:
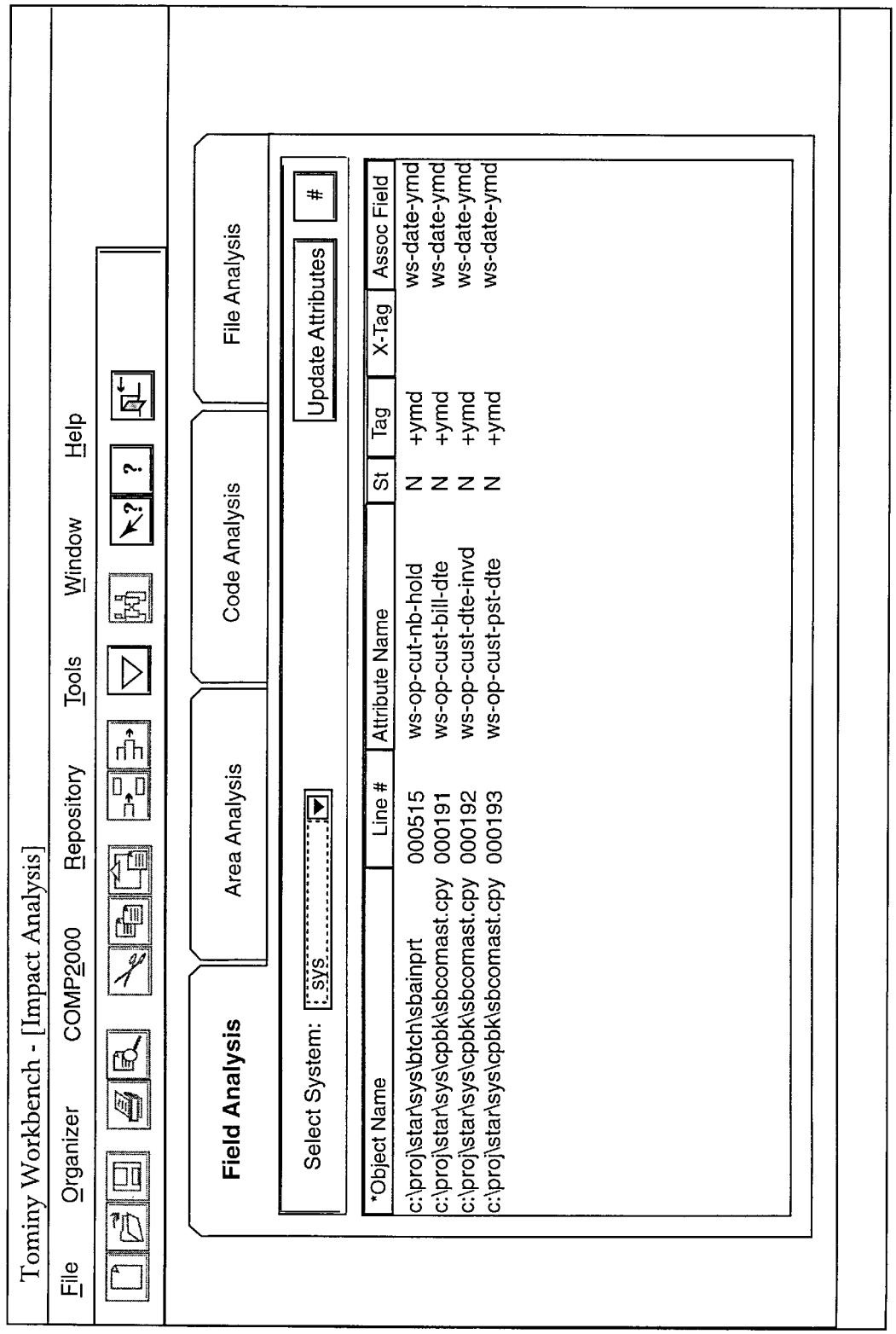

The impact analysis operations (operations 28 in FIG. 1) may be subdivided into different levels ranging from the local code level to the global system level. FIG. 15 illustrates an exemplary screen presented during the Field Analysis phase of impact analysis. The main purpose of field analysis is to review the results and determine whether to add new attributes to the attribute table. By clicking on the Update Attributes icon the user may add all of the displayed result fields with the displayed tag to the attribute table. The user can highlight and delete listed rows if those should not be added to the attribute table.

Figure 16:
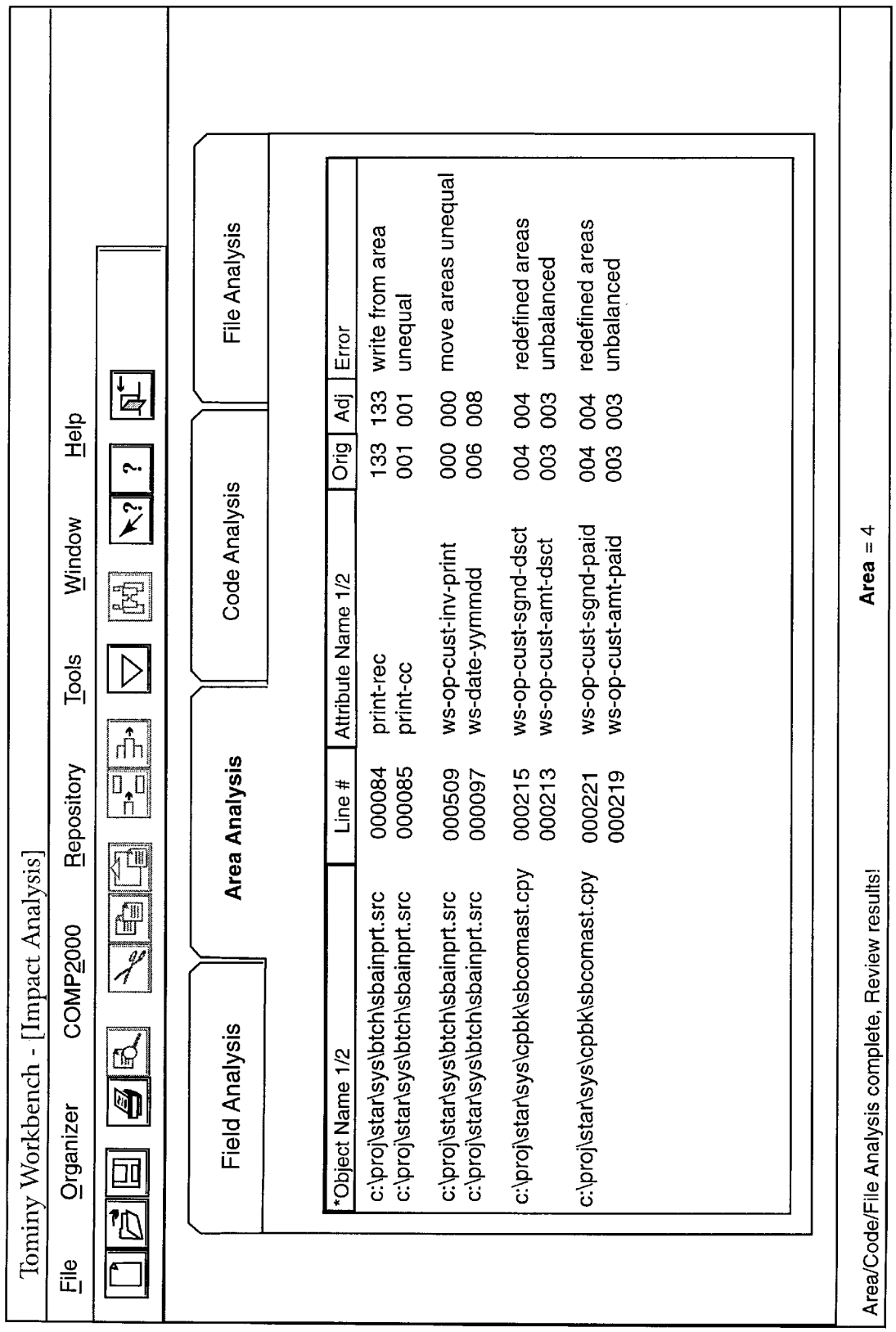

Area analysis is used to find "area moves" within the software system that are unbalanced. Areas that have changed in size due to an expansion of a date field, for example, should balance with all areas that communicate similar information. FIG. 16 gives an example of an Area Analysis report generated by the system. Note that the report identifies "write from areas" that are unequal, "move areas" that are unequal and "redefine areas" that are unbalanced. When "write from" areas are unequal, this is an indication that a write command was encountered and that the source and destination buffers are not of the same size. A "move areas unequal" condition occurs when an expanded field is being moved to another area that does not have the same area length. In some instances this may have been intended by the system programmer, however the reconfiguration workbench nevertheless reports this as a potential problem. A "redefined area as unbalanced" condition occurs when a data structure is being redefined by another data structure, and the length of the two structures are not the same.

From the foregoing it will be appreciated that the reconfiguration system of the invention provides a powerful tool for computer system software development and maintenance. The repository-based system is capable of handling large volumes of code and data, even in systems that are distributed across many shared entities. The workbench can be used by a single user or deployed across an entire workgroup. Because the system is a hybrid of both interactive and batch processing, a step-by-step, iterative refinement allows large reconfiguration jobs to be managed with high precision.

While the invention has been described in its presently preferred form, it will be understood that the invention is capable of modification without departing from the spirit of the invention as set forth in the appended claims.

It is claimed:

1. A software reconfiguration system comprising:
    an installed source memory for storing source code associated with a body of software to be reconfigured;
    a lexicon containing names of software entities subject to reconfiguration;
    a repository data structure for storing attributes associated with said software entities subject to reconfiguration;
    a tagging module that accesses said installed source memory and said lexicon to identify first software entities in said source code that correspond to names contained in said lexicon, said tagging module storing records in said repository corresponding to said first software entities identified, said records each including a tag attribute indicating a high degree of confidence that said first software entity is subject to reconfiguration;
    an impact analysis module that accesses said installed source memory and said repository to identify second software entities in said source code that corresponds to records stored in said repository, said impact analysis module associating with each second software entity a tag attribute indicating a lesser degree of confidence that said second software entity is subject to reconfiguration;
    a user interactive interface associated with at least one of said tagging and impact analysis modules through which a user may upgrade the tag attribute of selected second software entities to an attribute indicating a high degree of confidence;
    a source change module having at least one predefined master that modifies said source code associated with software entities corresponding to records stored in said repository, said source change module applying changes in said source code in accordance with said master.

2. The reconfiguration system of claim 1 wherein said lexicon includes second user interface to permit a user to modify the contents of said lexicon.

3. The reconfiguration system of claim 1 wherein said lexicon stores a change attribute associated with each name contained in the lexicon, the change attribute designating one of a plurality of different reconfiguration strategies that shall be applied to software entities corresponding to each name.

4. The reconfiguration system of claim 1 wherein said tagging module associates a change attribute with each tag attribute, the change attribute designating one of a plurality of different reconfiguration strategies that shall be applied to each software entity tagged.

5. The reconfiguration system of claim 1 wherein said tagging module associates a change attribute with each tag attribute, the change attribute being selected from said lexicon and designating one of a plurality of different reconfiguration strategies that shall be applied to each software entity tagged.

6. The reconfiguration system of claim 1 wherein said tagging module includes an interactive mode and a batch mode, said interactive mode providing a user interface to elicit user confirmation that a record corresponding to an identified software entity shall be added to said repository, said batch mode adding a record corresponding to an identified software entity without user interaction.

7. The reconfiguration system of claim 1 wherein said impact analysis module generates tag attributes indicating a plurality of successively lesser degrees of confidence.

8. The reconfiguration system of claim 1 wherein said impact analysis module further identifies third software entities in said source code that bear a relationship to second software entities, said impact analysis module associating with each third software entity a tag attribute indicating a degree of confidence lower than the lesser degree of confidence associated with second software entities.

9. The reconfiguration system of claim 1 wherein said impact analysis module examines said source code at multiple levels, including at least one local level that examines data flow between individual software entities, and at least one global level that examines data flow between plural groups of software entities.

10. The reconfiguration system of claim 9 wherein said plural groups of software entities represent program code areas.

11. The reconfiguration system of claim 9 wherein said plural groups of software entities represent files.

12. The reconfiguration system of claim 1 wherein said tagging module associates a change attribute with each tag attribute, the change attribute designating one of a plurality of different reconfiguration strategies that shall be applied to each software entity tagged; and wherein said source change module has at least one predefined master that describes each of said plurality of different reconfiguration strategies.

13. The reconfiguration system of claim 1 wherein said source change module applies said changes to produce modified source code and wherein said system further comprising a code renovation module that generates executable program code based on said modified source code.

14. The reconfiguration system of claim 1 wherein said body of software to be reconfigured includes data members stored according to a predefined format, wherein said repository stores a change attribute with each tag attribute, the change attribute designating one of a plurality of different reconfiguration strategies to be applied to each software entity tagged, and wherein said system further comprising data renovation module that accesses said repository and modifies the format of selected data members based on said change attributes.

15. The reconfiguration system of claim 1 further comprising a data renovation module coupled to said repository that updates data associated with said body of software to be reconfigured, based on said master.

* * * * *